S. Arnold,

Cage Trap.

No. 105,880.  Patented Aug. 2. 1870.

Witnesses:
Chas. Nida,
Alex F. Roberts

Inventor:
S. Arnold
per
Attorneys.

United States Patent Office.

SAMUEL ARNOLD, OF SILVER SPRINGS, TENNESSEE.

Letters Patent No. 105,880, dated August 2, 1870.

IMPROVEMENT IN ANIMAL TRAPS.

The Schedule referred to in these Letters Patent and making part of the same.

*To all whom it may concern:*

Be it known that I, SAMUEL ARNOLD, of Silver Springs, in the county of Wilson and State of Tennessee, have invented a new and useful Improvement in Animal-Traps; and I do hereby declare that the following is a full, clear, and exact description thereof, which will enable others skilled in the art to make and use the same, reference being had to the accompanying drawing forming part of this specification.

This invention relates to an improvement in traps for catching rats and other animals, and consists in the construction, arrangement, and combination of parts, as hereinafter described.

In the annexed drawing—

Similar letters of reference indicate corresponding parts.

Figure 1:
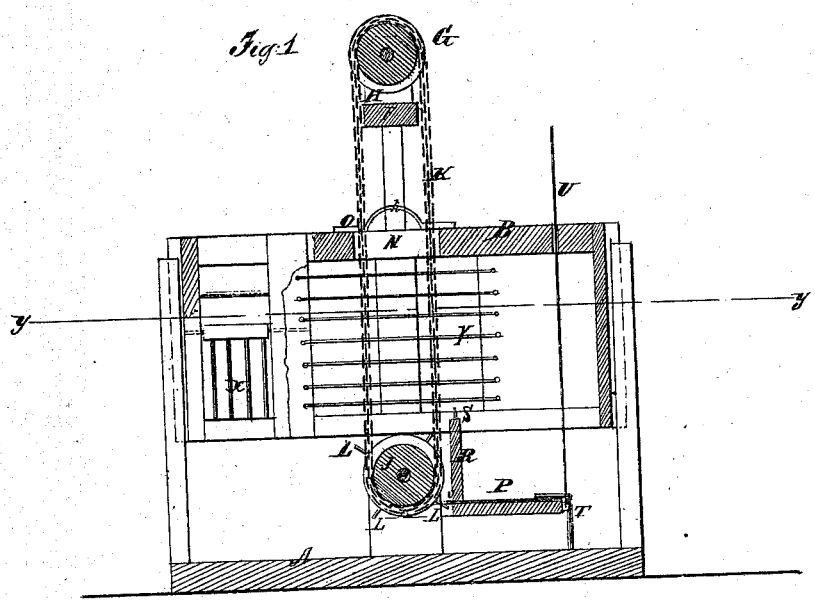
Figure 1 represents a vertical section of the trap, on the line $x\ x$ of fig. 2.
Figure 2:
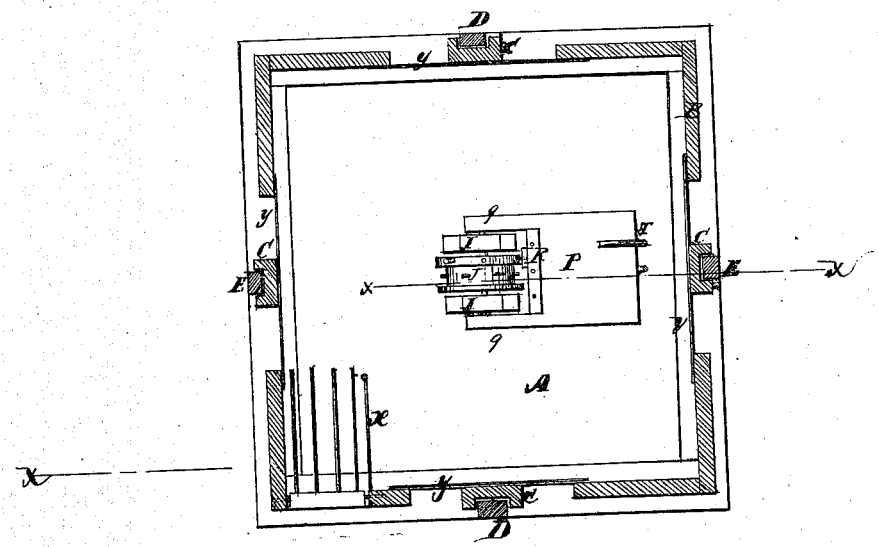
Figure 2 is a horizontal section looking down from the line $y\ y$ of fig 1.

A is the platform floor or bottom of the trap.

B is the box (its under side open) which is raised when the trap is set, and drops onto the bottom when the trap is sprung, thus securing the animal.

The box is guided up and down by means of grooved pieces C on its sides, which work on upright bars D D and E E, attached to the bottom, as seen in the drawing.

The uprights D D extend up above the top of the box and support a cross-piece, F, by means of which the box is suspended when the trap is set.

G is a pulley which revolves on pivots in ears H, on the cross piece F. The pulley G is over the center of the box.

Directly below, and revolving on pivots in the stands I I, (attached to the bottom) is another pulley, J.

K is an endless chain which passes around these pulleys.

L represents the setting wires in the pulley J, which project from the pulley, as seen in fig. 1. The chain K passes down from the upper pulley, through a mortise in the box, as seen at N, and one part of the chain is attached to the box, as seen at O; consequently, the chain and the box move up and down together.

P is the pan of the trap which is pivoted to the stands I I, by means of the projecting arms $q\ q$.

R is a stand on the pan, with wires S in its top end, upon which the bait is placed. The back portion of the pan P is prevented from rising by the hook T.

U is a rod which is attached to the back portion of the pan, and extends up through the trap, by means of which the pan is raised up to the hook T, for setting the trap.

On the top of the pan there is a thin metallic plate, which projects slightly, as seen at V, with which one of the wires L engages, to hold up the pan in the position seen in fig. 1.

It will be seen that the weight of the box hangs upon one part of the chain, which gives the chain a tendency to revolve on the pulleys. This tendency causes the wire L to bear upward against the projecting edge of the plate V, but the leverage is so slight that a small weight will depress the fan, which will cause the wire L to slip from the plate V, when the box will fall. The animal, in its efforts to get the bait, will in this manner spring the trap and be caught in the act.

The box B may be made of wood or metal, or of the two combined, as represented.

X is a wire drop-door in the side of the box, by means of which the trap may be used when the box is down upon the bottom.

Y represents wire grating in the sides of the box.

h is a loop or handle for raising the box in setting the trap.

Having thus described my invention,

I claim as new and desire to secure by Letters Patent—

The floor or bottom A, with its uprights and the cross-piece which they support, box B, with its grooves which work upon the uprights, pulleys G and J, chain K, and pan P, when the same are constructed and arranged to operate in combination, substantially as specified, and for the purpose described.

SAMUEL ARNOLD.

Witnesses:
F. P. ROSS,
J. W. WILLIAMS.